United States Patent
Shin et al.

(10) Patent No.: US 9,465,193 B2
(45) Date of Patent: Oct. 11, 2016

(54) IMAGING LENS SYSTEM

(71) Applicant: SAMSUNG ELECTRONICS CO., LTD., Suwon-si, Gyeonggi-do (KR)

(72) Inventors: Jeong-kil Shin, Suwon-si (KR); Seung-yong Kim, Suwon-si (KR); Han-eung Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 127 days.

(21) Appl. No.: 14/260,488

(22) Filed: Apr. 24, 2014

(65) Prior Publication Data

US 2014/0354876 A1    Dec. 4, 2014

(30) Foreign Application Priority Data

Jun. 3, 2013 (KR) .................. 10-2013-0063699

(51) Int. Cl.
*G02B 9/60* (2006.01)
*G02B 13/18* (2006.01)
*G02B 13/00* (2006.01)

(52) U.S. Cl.
CPC .............. *G02B 9/60* (2013.01); *G02B 13/0015* (2013.01); *G02B 13/0045* (2013.01); *G02B 13/18* (2013.01)

(58) Field of Classification Search
CPC .......... G02B 9/00; G02B 9/60; G02B 13/00; G02B 13/001; G02B 13/0015; G02B 13/002; G02B 13/0045; G02B 13/008; G02B 13/14; G02B 13/18
See application file for complete search history.

(56) References Cited

U.S. PATENT DOCUMENTS

| | | | |
|---|---|---|---|
| 7,502,181 B2 | 3/2009 | Shinohara | |
| 7,864,454 B1 | 1/2011 | Tang et al. | |
| 8,000,031 B1* | 8/2011 | Tsai ................... | G02B 13/0045 359/714 |
| 8,179,615 B1 | 5/2012 | Tang et al. | |
| 8,310,768 B2 | 11/2012 | Lin et al. | |
| 8,379,325 B2 | 2/2013 | Tsai et al. | |
| 2013/0314803 A1* | 11/2013 | Huang ................... | G02B 13/00 359/714 |
| 2014/0071334 A1* | 3/2014 | Nakagawa ......... | G02B 13/0045 348/360 |
| 2014/0285907 A1* | 9/2014 | Tang .................. | G02B 13/0045 359/714 |

* cited by examiner

*Primary Examiner* — Thong Nguyen
(74) *Attorney, Agent, or Firm* — Drinker Biddle & Reath LLP (57) ABSTRACT

An imaging lens system includes a first lens to a fifth lens sequentially disposed from an object side to an image side. The first lens has a positive refractive power and an object side lens surface that is convex toward the object side. The second lens has a negative refractive power and a meniscus shape that is concave toward the image side. The third lens has a positive refractive power. The fourth lens has a negative refractive power and a meniscus shape that is concave toward the object side. The fifth lens has a negative refractive power and a meniscus shape that is concave toward the image side near an optical axis. The imaging lens system satisfies the following condition: $f34/f<-5$, where f denotes a focal length of the imaging lens system, and f34 denotes an effective focal length of the third lens and the fourth lens.

11 Claims, 10 Drawing Sheets

IMAGING LENS SYSTEM

CROSS-REFERENCE TO RELATED PATENT APPLICATIONS

This application claims the priority benefit of Korean Patent Application No. 10-2013-0063699, filed on Jun. 3, 2013, in the Korean Intellectual Property Office, the disclosure of which is incorporated herein in its entirety by reference.

BACKGROUND

1. Field

One or more embodiments of the invention relate to an imaging lens system suitable for an electronic device employing an image pickup device having high pixel density.

2. Description of the Related Art

Recently, digital cameras and video cameras having a solid state image pickup device, such as a charge-coupled device (CCD), a complementary metal-oxide semiconductor (CMOS) image pickup device, or the like, are widely used.

In addition, along with the miniaturization and high pixel density of an image pickup device, and the continuous demand for the miniaturization of a camera module, an imaging lens assembled with the camera module also requires miniaturization and high pixel density. Since a lens system requires miniaturization and high resolution, the number of lenses employed in an imaging lens for the lens system also increases, and five or more lenses are usually used in correspondence with high pixel density.

Designs for various imaging lens systems employing five lenses have been suggested, but many designs are inadequate in terms of aberration correction, easy manufacturing, and the like. Examples of the inadequate designs include a design having a high possibility of the occurrence of a flare and a design having high assembly sensitivity by employing a bi-concave lens.

Accordingly, existing lens designs still need to be improved in terms of miniaturization, optical performance and easy manufacturing.

SUMMARY

One or more embodiments include an imaging lens system that has a miniaturized structure and is suitable for an image pickup device having high pixel density.

Additional aspects will be set forth in part in the description which follows and, in part, will become apparent from the description, or may be learned by practice of the presented embodiments.

According to one or more embodiments, an imaging lens system includes a first lens to a fifth lens sequentially disposed from an object side to an image side. The first lens has a positive refractive power and an object side lens surface that is convex toward the object side. The second lens has a negative refractive power and a meniscus shape that is concave toward the image side. The third lens has a positive refractive power. The fourth lens has a negative refractive power and a meniscus shape that is concave toward the object side. The fifth lens has a negative refractive power and a meniscus shape that is concave toward the image side near an optical axis. The imaging lens system satisfies the conditions below:

$$-524 < f34/f < -5, \text{ and}$$

$$-14 < f5/f < -4,$$

where f denotes a focal length of the imaging lens system, f34 denotes an effective focal length of the third lens and the fourth lens, and f5 denotes a focal length of the fifth lens.

The imaging lens system may satisfy the condition below:

$$-1.8 < f2/f1 < -1.3,$$

where f1 denotes a focal length of the first lens, and f2 denotes a focal length of the second lens.

The imaging lens system may satisfy the condition below:

$$20 < V1 - V2 < 50,$$

where V1 denotes an Abbe number of the first lens, and V2 denotes an Abbe number of the second lens.

The image side lens surface of the third lens may be flat.

An aperture stop may be disposed between the first lens and the second lens.

The first to fifth lenses may be made of a plastic material.

Each of the first to fifth lenses may be an aspheric lens including at least one aspheric surface.

According to one or more embodiments, an imaging lens system includes a first lens to a fifth lens sequentially disposed from an object side to an image side. The first lens has a positive refractive power and an object side lens surface that is convex toward the object side. The second lens has a negative refractive power and a meniscus shape that is concave toward the image side. The third lens has positive refractive power. The fourth lens has a negative refractive power and a meniscus shape that is concave toward the object side. The fifth lens has a negative refractive power and a meniscus shape that is concave toward the image side near an optical axis. The imaging lens system satisfies the conditions below:

$$-524 < f34/f < -5, \text{ and}$$

$$-14 < -1.8 < f2/f1 < -1.3,$$

where f denotes a focal length of the imaging lens system, f34 denotes an effective focal length of the third lens and the fourth lens, f1 denotes a focal length of the first lens, and f2 denotes a focal length of the second lens.

The imaging lens system may satisfy the condition below:

$$20 < V1 - V2 < 50,$$

where V1 denotes an Abbe number of the first lens, and V2 denotes an Abbe number of the second lens.

The image side lens surface of the third lens may be flat.

An aperture stop may be disposed between the first lens and the second lens.

The first to fifth lenses may be made of a plastic material.

Each of the first to fifth lenses may be an aspheric lens including at least one aspheric surface.

According to one or more embodiments, an electronic apparatus includes one of the image lens systems described above, and an image pickup device that converts an optical image formed by the image lens system into an electrical signal.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to various embodiments, examples of which are illustrated in the accompanying drawings, where like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. Hereinafter, imaging lens systems according to embodiments of the invention are described in detail with reference to the accompanying drawings.

FIGS. 1, 3, 5, 7, and 9 show optical arrangements of an imaging lens system according to the first to fifth embodiments, respectively.

Referring to FIGS. 1, 3, 5, 7, and 9, the imaging lens system includes a first lens 10 having a positive refractive power and a convex shape toward an object OBJ, a second lens 20 having a negative refractive power and a meniscus shape that is concave toward an image plane IMG, a third lens 30 having positive refractive power, a fourth lens 40 having a negative refractive power and a meniscus shape that is concave towards the object OBJ, and a fifth lens 50 having a negative refractive power and a meniscus shape that is concave towards the image plane IMG near an optical axis. The first to fifth lenses 10, 20, 30, 40, and 50 are sequentially disposed in this order from the side of the object OBJ to the side of the image plane IMG.

An aperture stop ST may be disposed between the first lens 10 and the second lens 20. An image pickup device (not shown), such as a charge-coupled device (CCD) or a complementary metal-oxide semiconductor (CMOS) image pickup device, is disposed on the image plane IMG. An infrared blocking lens or filter 60 may be disposed between the fifth lens 50 and the image plane IMG.

The imaging lens system may satisfy Condition (1) below.

$$-524 < f34/f < -5 \qquad \text{Condition (1)}$$

In Condition (1), f34 denotes an effective focal length of the third lens 30 and the fourth lens 40, and f denotes the entire focal length of the imaging lens system.

The imaging lens system may satisfy Condition (2) below.

$$-14 < f5/f < -4 \qquad \text{Condition (2)}$$

In Condition (2), f5 denotes a focal length of the fifth lens 50, and f denotes the entire focal length of the imaging lens system.

Conditions (1) and (2) define the relationships between the refractive power of each of the third lens 30, the fourth lens 40, and the fifth lens 50 and the total refractive power of the imaging lens system. In detail, Condition (1) defines a ratio of the effective focal length of the third lens 30 and the fourth lens 40 to the entire focal length of the imaging lens system, and Condition (2) defines a ratio of the focal length of the fifth lens 50 to the entire focal length of the imaging lens system.

In the range that exceeds the upper limit of each of Conditions (1) and (2), it is difficult to make the imaging lens system thin, and distortion aberration increases.

The imaging lens system may satisfy Condition (3) below.

$$-1.8 < f2/f1 < -1.3 \qquad \text{Condition (3)}$$

In Condition (3), f1 denotes a focal length of the first lens 10, and f2 denotes a focal length of the second lens 20.

Condition (3) defines a relationship between the refractive power of the first lens 10 and the refractive power of the second lens 20 by taking into consideration chromatic aberration and assembly sensitivity.

In the range below the lower limit of Condition (3), the refractive power of the first lens 10 is strong, thereby increasing assembly sensitivity. In the range that exceeds the upper limit of Condition (3), the refractive power of the first lens 10 is weak, and thus, chromatic aberration correction is insufficient, and accordingly, it is difficult to obtain high resolution.

The imaging lens system may satisfy Condition (4) below.

$$20 < V1 - V2 < 50, \qquad \text{Condition (4)}$$

In Condition (4), V1 denotes an Abbe number of the first lens 10, and V2 denotes an Abbe number of the second lens 20.

Condition (4) is directed to an Abbe number difference between the first lens 10 and the second lens 20, and when Condition (4) is satisfied, chromatic aberration may be properly corrected.

The third lens 30 may have one flat surface, and accordingly, it is easier to manufacture the third lens 30.

The first to fifth lenses 10, 20, 30, 40, and 50 may be formed of a plastic material, and accordingly, manufacturing costs thereof may be reduced.

All of the first to fifth lenses 10, 20, 30, 40, and 50 may be aspheric lenses including at least one aspheric surface.

Lens data according to the first to fifth embodiments will now be described. In the lens data, ST denotes an aperture stop, the mark "*" ahead a surface number indicates that the corresponding surface is an aspheric surface. In addition, f denotes the entire focal length of the imaging lens system, Fno denotes an F number, ω denotes a half field of view. The unit of a radius of curvature R, a thickness, or an air gap is mm.

An aspheric surface is defined by Equation 1.

$$Z = \frac{cY^2}{1 + \sqrt{1 - (1+K)c^2Y^2}} + AY^4 + BY^6 + CY^8 + DY^{10} + EY^{12} + FY^{14} + \ldots \quad \text{Equation (1)}$$

In Equation 1, Z denotes a distance from the vertex of a lens in an optical axis direction, Y denotes a distance in a direction orthogonal to the optical axis direction, K denotes a conic constant, A, B, C, D, E, and F denote aspheric coefficients, and c denotes the reciprocal of the radius of curvature R (1/R) at the vertex of the lens.

<First Embodiment>

Figure 1:
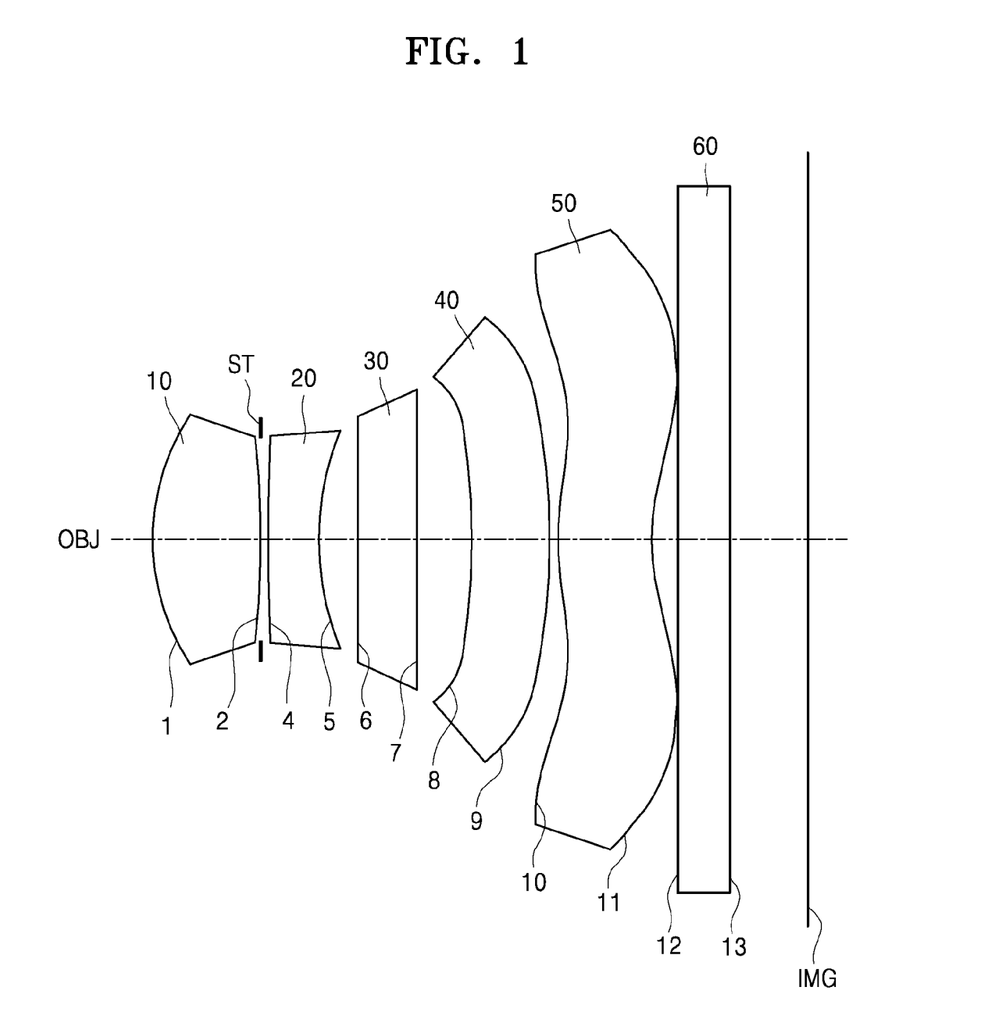
FIG. 1 illustrates an optical arrangement of an imaging lens system, according to a first embodiment.

Lens data of imaging lens system according to the first embodiment, as shown in FIG. 1, is as below.

f=3.392 mm Fno=2.45 ω=33.5°

TABLE 1

| Surface | Radius of curvature | Thickness or air gap | Refractive index | Abbe number |
|---|---|---|---|---|
| OBJ | ∞ | ∞ | | |
| *1 | 1.2808 | 0.6395 | 1.535 | 56 |
| *2 | −4.8972 | 0.0000 | | |
| ST | ∞ | 0.0400 | | |
| *4 | 15.6941 | 0.3000 | 1.64 | 23 |
| *5 | 1.7578 | 0.2366 | | |
| *6 | 14.5247 | 0.3550 | 1.535 | 56 |
| 7 | ∞ | 0.3158 | | |
| *8 | −3.3848 | 0.4651 | 1.64 | 23 |
| *9 | −6.0164 | 0.0550 | | |
| *10 | 1.4852 | 0.5598 | 1.535 | 56 |
| *11 | 1.2161 | 0.1592 | | |
| 12 | ∞ | 0.3000 | 1.62 | 64 |
| 13 | ∞ | 0.4840 | | |

Figure 2:
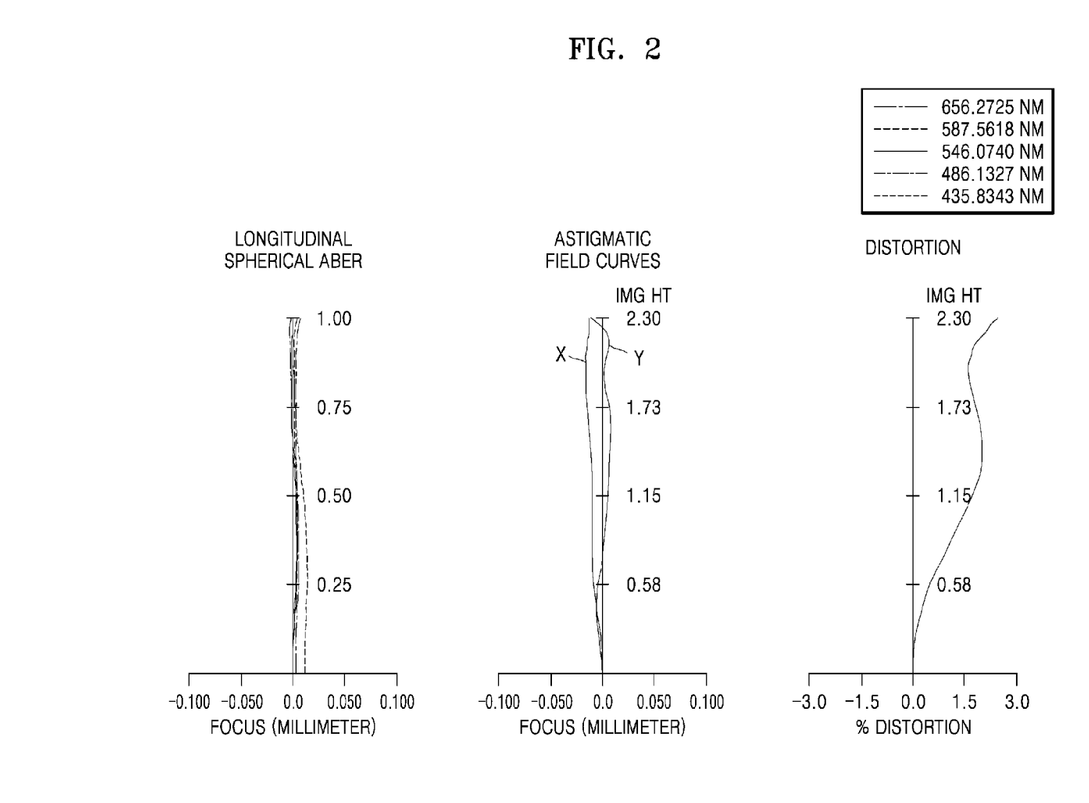
FIG. 2 illustrates diagrams of longitudinal spherical aberration, astigmatic field curves, and distortion of the imaging lens system according to the first embodiment.

FIG. 2 illustrates diagrams of longitudinal spherical aberration, astigmatic field curves, and distortion of the imaging lens system according to the first embodiment. The longitudinal spherical aberration diagram is shown for light having wavelengths of 656.2725 nm, 587.5618 nm, 546.0740 nm, 486.1327 nm, and 435.8343 nm, and the astigmatic field diagram and the distortion diagram are shown for the light having a wavelength of 546.0740 nm. In the astigmatic field diagram, curves on a sagittal field curvature and a tangential field curvature are shown as X and Y, respectively.

<Second Embodiment>

Figure 3:
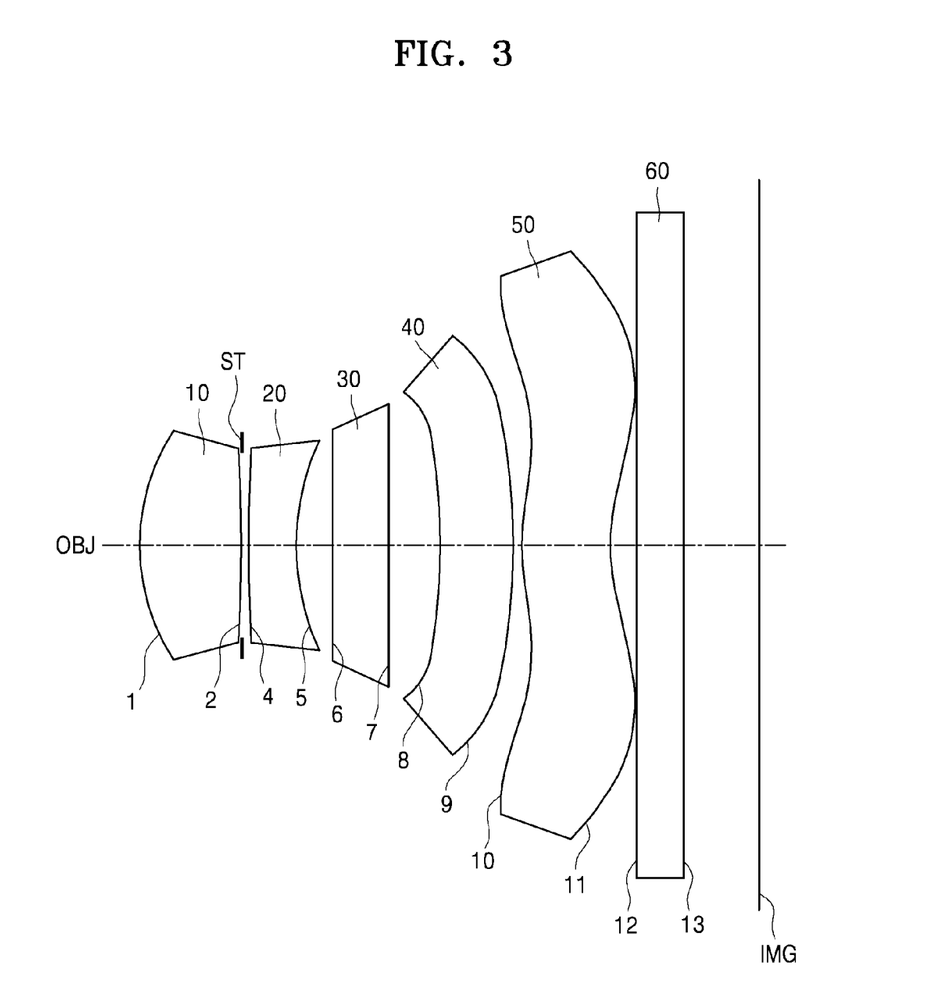
FIG. 3 illustrates an optical arrangement of an imaging lens system, according to a second embodiment.

Lens data of the imaging lens system according to the second embodiment, as shown in FIG. 3, is as below.

f=3.387 mm Fno=2.45 ω=33.5°

TABLE 3

| Surface | Radius of curvature | Thickness or air gap | Refractive index | Abbe number |
|---|---|---|---|---|
| OBJ | ∞ | ∞ | | |
| *1 | 1.2801 | 0.6414 | 1.535 | 56 |
| *2 | −5.1048 | 0.0000 | | |
| ST | ∞ | 0.0400 | | |
| *4 | 12.5776 | 0.3000 | 1.64 | 23 |
| *5 | 1.6842 | 0.2284 | | |
| *6 | 11.0073 | 0.3550 | 1.535 | 56 |
| 7 | ∞ | 0.3235 | | |
| *8 | −3.2415 | 0.4676 | 1.64 | 23 |
| *9 | −5.6321 | 0.0550 | | |
| *10 | 1.4826 | 0.5585 | 1.535 | 56 |
| *11 | 1.2108 | 0.1592 | | |
| 12 | ∞ | 0.3000 | 1.62 | 64 |
| 13 | ∞ | 0.4400 | | |

TABLE 2

| Surface | R | K | A | B | C | D | E | F |
|---|---|---|---|---|---|---|---|---|
| 1 | 1.2808E+00 | −1.2228E−01 | −2.0268E−02 | −3.2093E−03 | −6.2545E−02 | 1.4958E−02 | −7.7274E−02 | 0.0000E+00 |
| 2 | −4.8972E+00 | −8.4005E+01 | 1.0595E−02 | −2.4612E−02 | −4.8359E−02 | −3.2281E−01 | 4.4865E−01 | 0.0000E+00 |
| 4 | 1.5694E+01 | 2.2665E+02 | 3.8853E−02 | 1.6968E−01 | −5.0896E−01 | 6.4475E−01 | −1.8144E−01 | 0.0000E+00 |
| 5 | 1.7578E+00 | −7.1177E+00 | 1.1323E−01 | 2.7285E−01 | −5.3768E−01 | 7.1675E−01 | 1.3115E−02 | 0.0000E+00 |
| 6 | 1.4525E+01 | −2.8601E+03 | −1.5415E−02 | −9.8918E−02 | 2.1313E−01 | −2.1624E−01 | −1.5116E−01 | 0.0000E+00 |
| 8 | −3.3848E+00 | −1.6520E+02 | −5.3759E−02 | 2.8354E−02 | −2.3139E−01 | 7.5610E−02 | 1.7044E−01 | −2.0452E−01 |
| 9 | −6.0164E+00 | 1.7746E+01 | −1.6020E−02 | −3.3690E−03 | −3.1589E−02 | 3.2587E−02 | −1.9109E−02 | 4.4184E−03 |
| 10 | 1.4852E+00 | −1.5904E+01 | −2.4114E−01 | 7.0610E−02 | 1.4387E−02 | −7.8137E−03 | 3.2546E−04 | 1.2257E−04 |
| 11 | 1.2161E+00 | −7.1275E+00 | −1.4281E−01 | 5.7939E−02 | −2.1812E−02 | 4.0942E−03 | −2.7102E−04 | 5.7266E−06 |

TABLE 4

| Surface | R | K | A | B | C | D | E | F |
|---|---|---|---|---|---|---|---|---|
| 1 | 1.2801E+00 | −1.0738E−01 | −1.9082E−02 | −9.9981E−04 | −5.8806E−02 | 1.0379E−02 | −6.5891E−02 | 0.0000E+00 |
| 2 | −5.1048E+00 | −9.3209E+01 | 1.2445E−02 | −2.1501E−02 | −4.0995E−02 | −3.3752E−01 | 4.5009E−01 | 0.0000E+00 |
| 4 | 1.2578E+01 | 9.2829E+01 | 2.5553E−02 | 1.8011E−01 | −5.0392E−01 | 6.1030E−01 | −1.8093E−01 | 0.0000E+00 |
| 5 | 1.6842E+00 | −6.9459E+00 | 1.1646E−01 | 2.5639E−01 | −4.8488E−01 | 6.4623E−01 | 1.2825E−02 | 0.0000E+00 |
| 6 | 1.1007E+01 | −1.2391E+03 | −5.8983E−04 | −9.5556E−02 | 2.0519E−01 | −2.1892E−01 | −9.8663E−02 | 0.0000E+00 |
| 8 | −3.2415E+00 | −1.4507E+02 | −6.8535E−02 | 3.8451E−02 | −2.3296E−01 | 7.1944E−02 | 1.6230E−01 | −2.0121E−01 |
| 9 | −5.6321E+00 | 1.5765E+01 | −2.4612E−02 | 3.7582E−03 | −3.1717E−02 | 3.1079E−02 | −1.9065E−02 | 4.7655E−03 |
| 10 | 1.4826E+00 | −1.5766E+01 | −2.4584E−01 | 7.2945E−02 | 1.4393E−02 | −7.9326E−03 | 2.9259E−04 | 1.3540E−04 |
| 11 | 1.2108E+00 | −7.0197E+00 | −1.4341E−01 | 5.7976E−02 | −2.1742E−02 | 4.0914E−03 | −2.8237E−04 | 7.9249E−06 |

Figure 4:
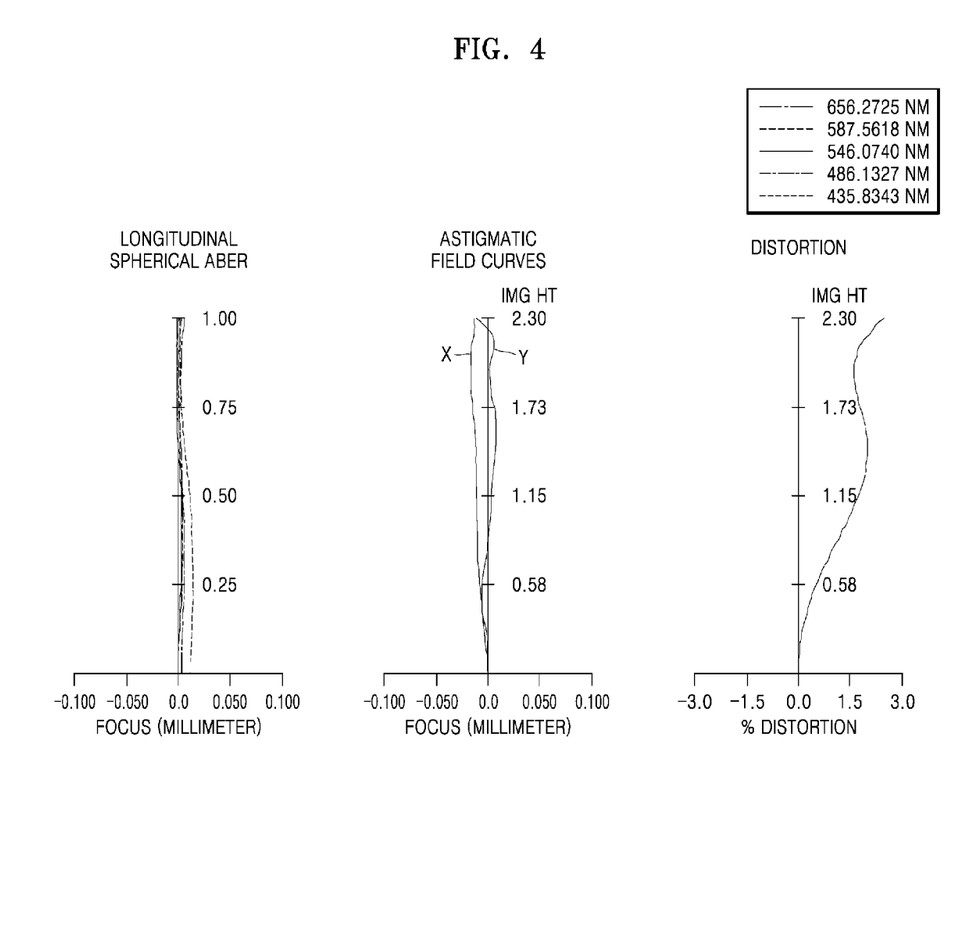
FIG. 4 illustrates diagrams of longitudinal spherical aberration, astigmatic field curves, and distortion of the imaging lens system according to the second embodiment.

FIG. 4 illustrates diagrams of longitudinal spherical aberration, astigmatic field curves, and distortion of the imaging lens system according to the second embodiment.

<Third Embodiment>

Figure 5:
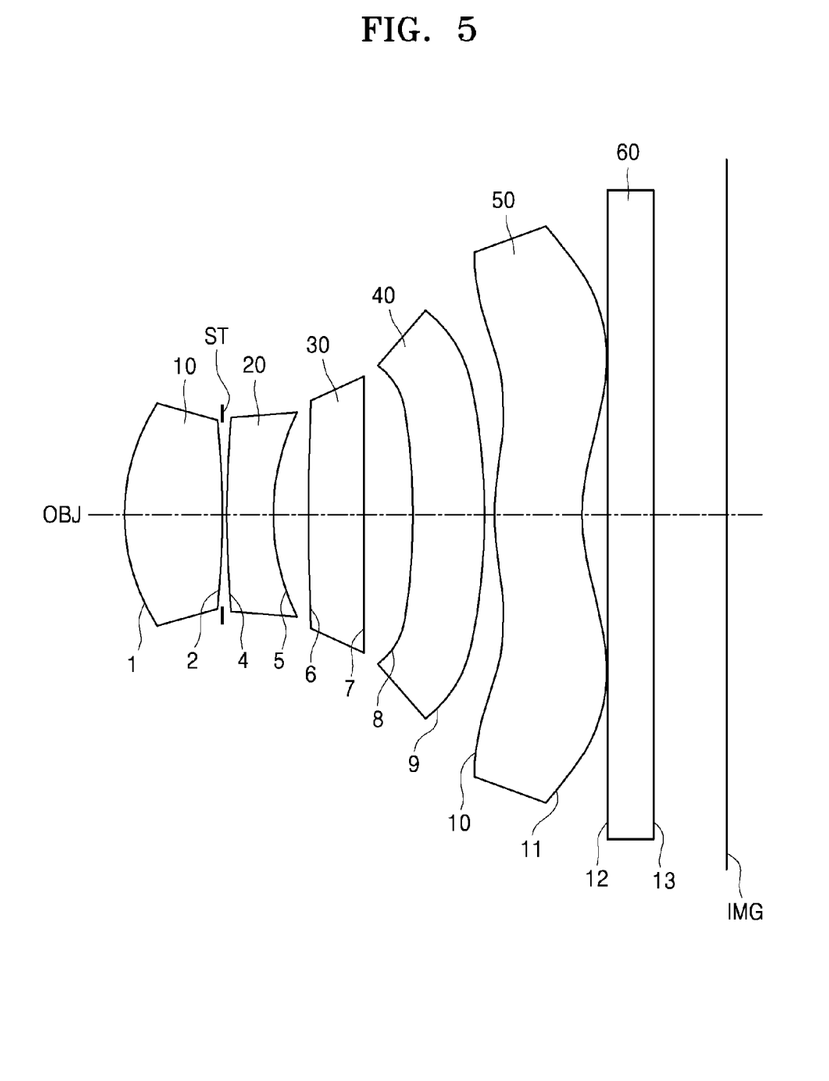
FIG. 5 illustrates an optical arrangement of an imaging lens system, according to a third embodiment.

Lens data of the imaging lens system according to the third embodiment, as shown in FIG. 5, is as below.

f=3.385 mm Fno=2.45 ω=33.5°

TABLE 5

| Surface | Radius of curvature | Thickness or air gap | Refractive index | Abbe number |
|---|---|---|---|---|
| OBJ | ∞ | ∞ | | |
| *1 | 1.2871 | 0.6230 | 1.535 | 56 |
| *2 | −5.1478 | 0.0000 | | |
| ST | ∞ | 0.0400 | | |
| *4 | 11.0443 | 0.3000 | 1.64 | 23 |
| *5 | 1.6503 | 0.2294 | | |
| *6 | 9.5136 | 0.3550 | 1.535 | 56 |
| 7 | ∞ | 0.3257 | | |
| *8 | −3.1010 | 0.4616 | 1.64 | 23 |
| *9 | −5.0681 | 0.0635 | | |
| *10 | 1.5041 | 0.5686 | 1.535 | 56 |
| *11 | 1.1996 | 0.1631 | | |
| 12 | ∞ | 0.3000 | 1.62 | 64 |
| 13 | ∞ | 0.4400 | | |

TABLE 7

| Surface | Radius of curvature | Thickness or air gap | Refractive index | Abbe number |
|---|---|---|---|---|
| OBJ | ∞ | ∞ | | |
| *1 | 1.3147 | 0.6250 | 1.535 | 56 |
| *2 | −5.1580 | 0.0000 | | |
| ST | ∞ | 0.0400 | | |
| *4 | 8.4444 | 0.3000 | 1.64 | 23 |
| *5 | 1.6052 | 0.2317 | | |
| *6 | 9.0922 | 0.3550 | 1.535 | 56 |
| 7 | ∞ | 0.3228 | | |
| *8 | −3.3656 | 0.4599 | 1.64 | 23 |
| *9 | −5.2397 | 0.0708 | | |
| *10 | 1.5096 | 0.5522 | 1.535 | 56 |
| *11 | 1.1614 | 0.1683 | | |
| 12 | ∞ | 0.3000 | 1.62 | 64 |
| 13 | ∞ | 0.4400 | | |

TABLE 6

| Surface | R | K | A | B | C | D | E | F |
|---|---|---|---|---|---|---|---|---|
| 1 | 1.2871E+00 | −1.2689E−01 | −2.0716E−02 | 3.3191E−03 | −9.5519E−02 | 7.3232E−02 | −1.1237E−01 | 0.0000E+00 |
| 2 | −5.1478E+00 | −8.2506E+01 | 1.5087E−02 | −1.9787E−02 | −5.2890E−02 | −3.4053E−01 | 4.6899E−01 | 0.0000E+00 |
| 4 | 1.1044E+01 | 9.8151E+01 | 1.5263E−02 | 2.2676E−01 | −5.9637E−01 | 6.8513E−01 | −1.8012E−01 | 0.0000E+00 |
| 5 | 1.6503E+00 | −7.2366E+00 | 1.2980E−01 | 2.5181E−01 | −4.9181E−01 | 6.4065E−01 | 1.2023E−02 | 0.0000E+00 |
| 6 | 9.5136E+00 | −8.5518E+02 | 6.2616E−03 | −9.3690E−02 | 1.9217E−01 | −1.7087E−01 | −1.4146E−01 | 0.0000E+00 |
| 8 | −3.1010E+00 | −1.2249E+02 | −5.9598E−02 | 2.2654E−02 | −2.3616E−01 | 1.1751E−01 | 1.0851E−01 | −1.8418E−01 |
| 9 | −5.0681E+00 | 1.2551E+01 | −5.5093E−04 | −2.4523E−02 | −1.1700E−02 | 2.5212E−02 | −1.9712E−02 | 5.3291E−03 |
| 10 | 1.5041E+00 | −1.5118E+01 | −2.4414E−01 | 7.2152E−02 | 1.4196E−02 | −7.8224E−03 | 3.1412E−04 | 1.2614E−04 |
| 11 | 1.1996E+00 | −6.7310E+00 | −1.4403E−01 | 5.8588E−02 | −2.1676E−02 | 4.0813E−03 | −2.8503E−04 | 6.4991E−06 |

Figure 6:
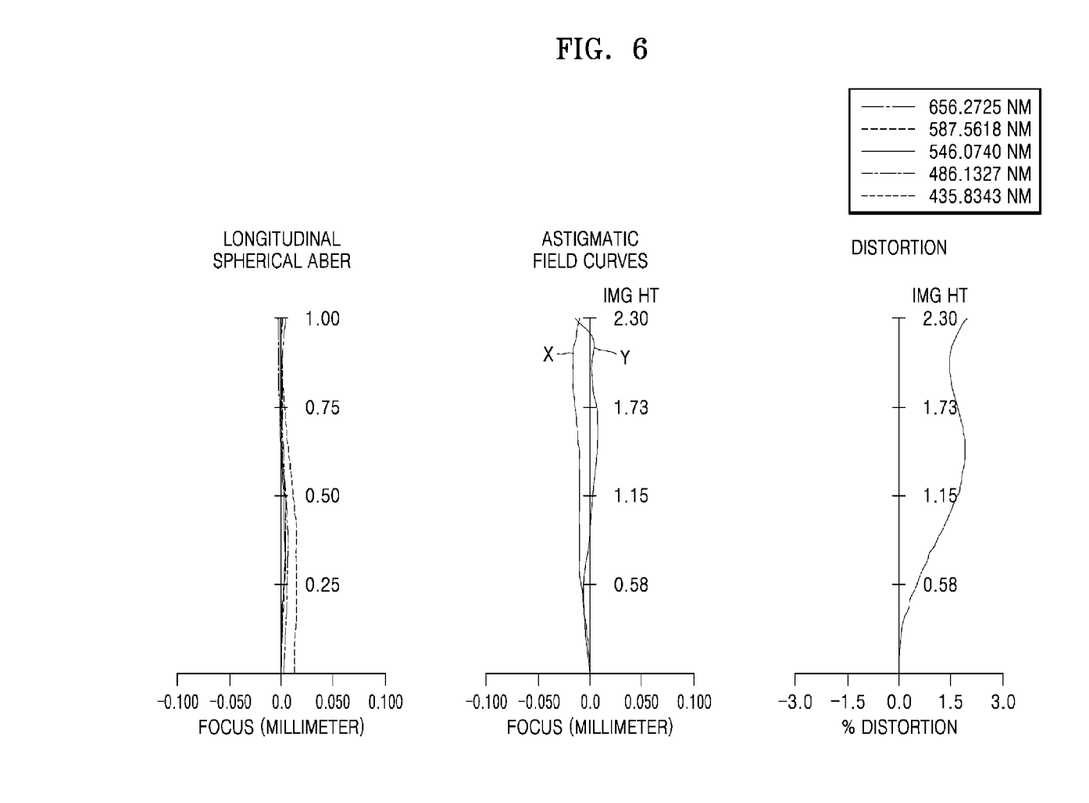
FIG. 6 illustrates diagrams of longitudinal spherical aberration, astigmatic field curves, and distortion of the imaging lens system according to the third embodiment.

FIG. 6 illustrates diagrams of longitudinal spherical aberration, astigmatic field curves, and distortion of the imaging lens system according to the third embodiment.

TABLE 8

| Surface | R | K | A | B | C | D | E | F |
|---|---|---|---|---|---|---|---|---|
| 1 | 1.3147E+00 | −1.6285E−01 | −2.4848E−02 | 9.0090E−03 | −1.4106E−01 | 1.3430E−01 | −1.4540E−01 | 0.0000E+00 |
| 2 | −5.1580E+00 | −3.6038E+01 | 1.0680E−02 | −9.6561E−03 | −6.0908E−02 | −3.6815E−01 | 5.4999E−01 | 0.0000E+00 |
| 4 | 8.4444E+00 | 4.2241E+01 | −3.0145E−02 | 3.2733E−01 | −6.8137E−01 | 7.4217E−01 | −1.7995E−01 | 0.0000E+00 |
| 5 | 1.6052E+00 | −7.6703E+00 | 1.4022E−01 | 2.2336E−01 | −4.6101E−01 | 6.2450E−01 | 8.4205E−03 | 0.0000E+00 |
| 6 | 9.0922E+00 | −6.8006E+02 | 6.8815E−03 | −7.1967E−02 | 9.9475E−02 | −1.7622E−01 | −2.7910E−01 | 0.0000E+00 |
| 8 | −3.3656E+00 | −1.5144E+02 | −5.0609E−02 | 4.6033E−03 | −2.3644E−01 | 1.8201E−01 | 1.0826E−02 | −1.3198E−01 |
| 9 | −5.2397E+00 | 1.3452E+01 | 1.7108E−02 | −5.7928E−02 | 2.3421E−02 | 3.2212E−03 | −1.1979E−02 | 4.1626E−03 |
| 10 | 1.5096E+00 | −1.5810E+01 | −2.4579E−01 | 7.3575E−02 | 1.3228E−02 | −7.5766E−03 | 3.4911E−04 | 1.1215E−04 |
| 11 | 1.1614E+00 | −7.0223E+00 | −1.4484E−01 | 5.8135E−02 | −2.1283E−02 | 3.9062E−03 | −2.7554E−04 | 1.1492E−05 |

<Fourth Embodiment>

Figure 7:
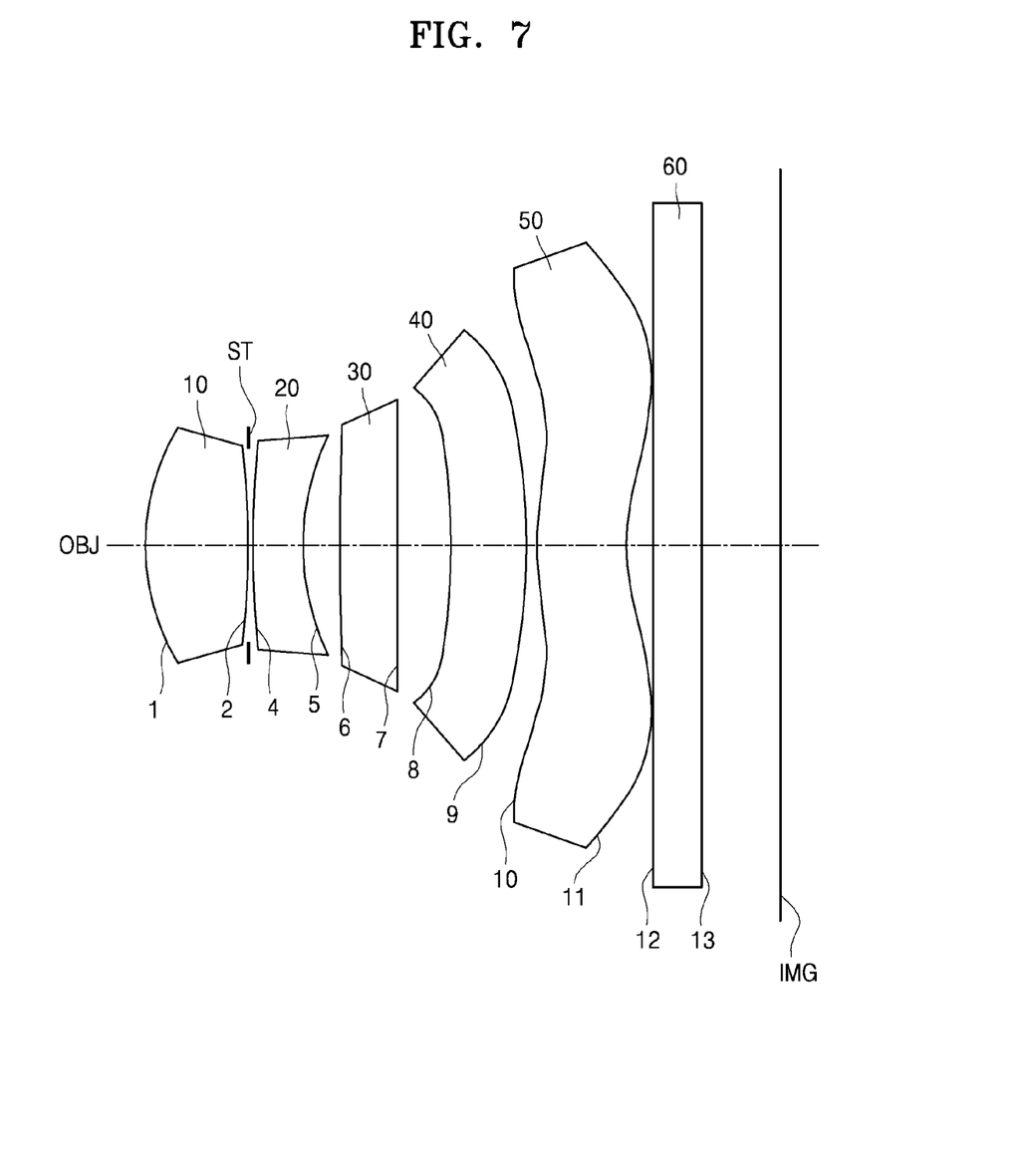
FIG. 7 illustrates an optical arrangement of an imaging lens system, according to a fourth embodiment.

Lens data of the imaging lens system according to the fourth embodiment, as shown in FIG. 7, is as below.

f=3.391 mm Fno=2.45 ω=33.5°

Figure 8:
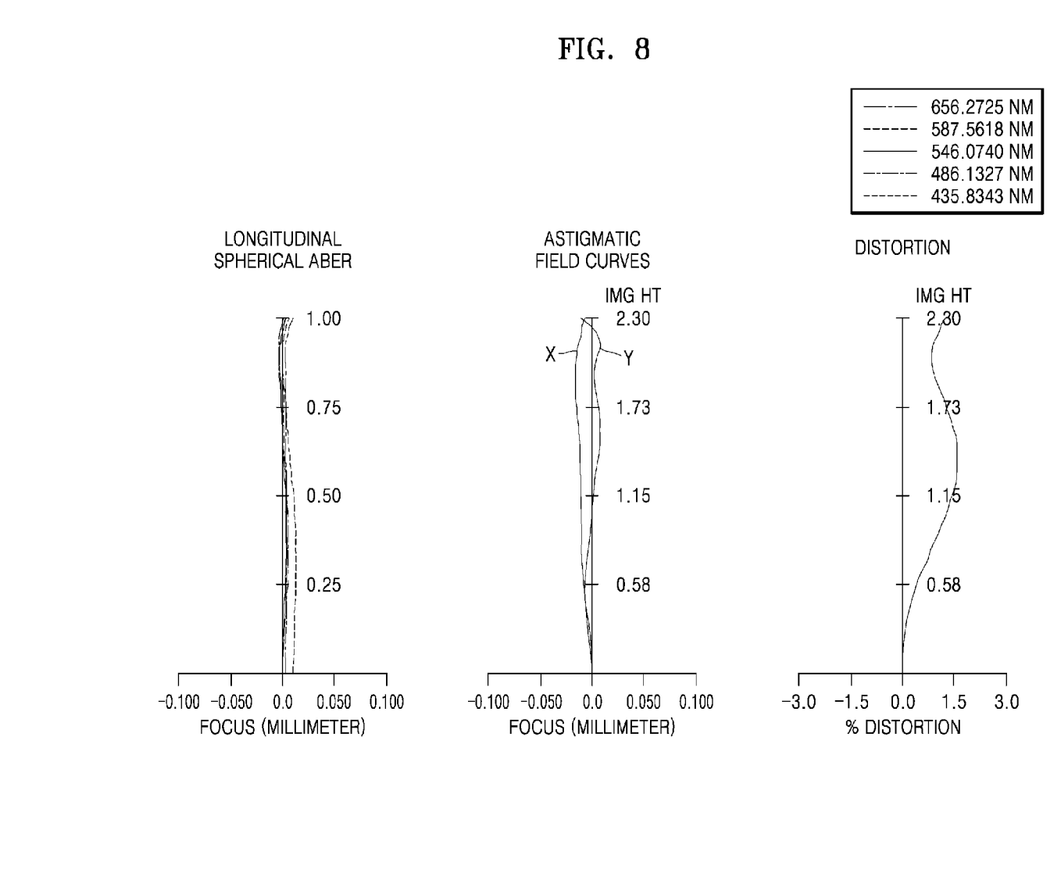
FIG. 8 illustrates diagrams of longitudinal spherical aberration, astigmatic field curves, and distortion of the imaging lens system according to the fourth embodiment.

FIG. 8 illustrates diagrams of longitudinal spherical aberration, astigmatic field curves, and distortion of the imaging lens system according to the fourth embodiment.

<Fifth Embodiment>

Figure 9:
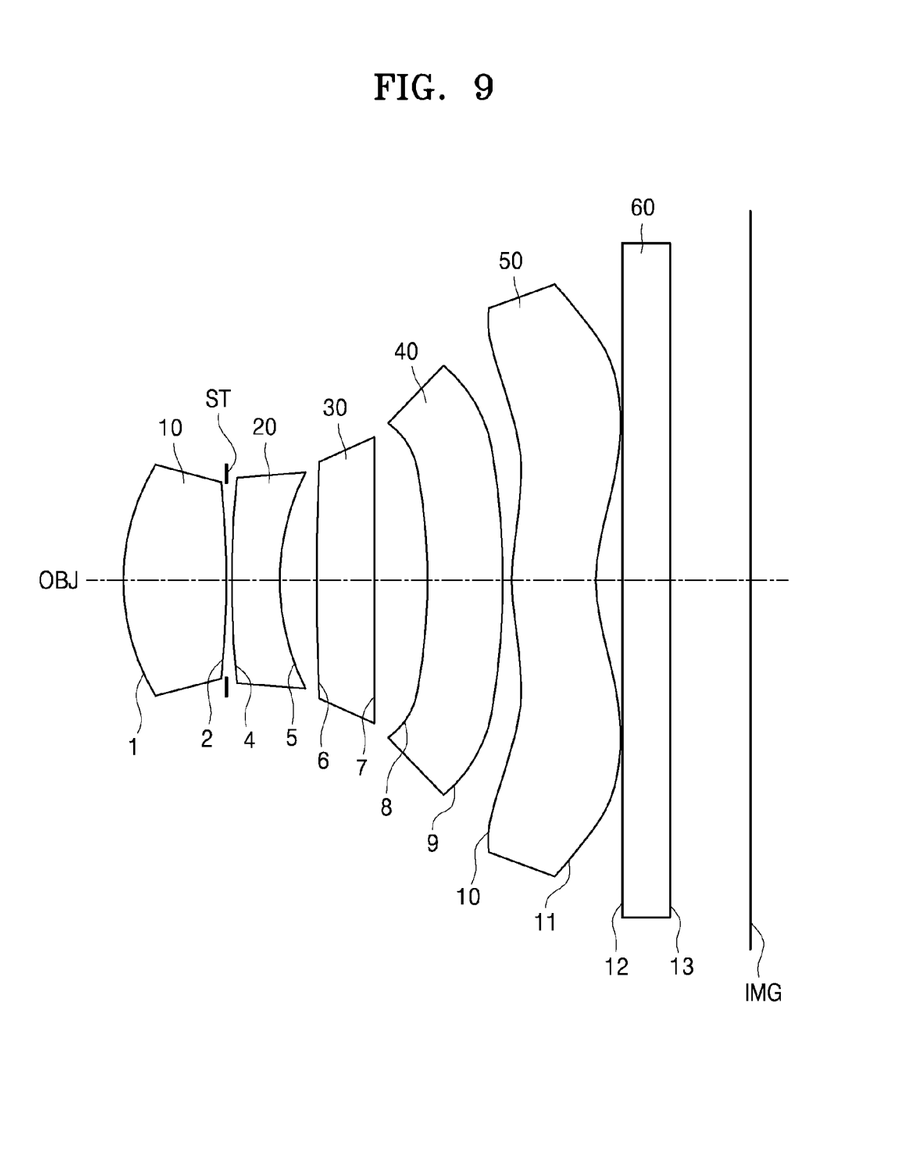
FIG. 9 illustrates an optical arrangement of an imaging lens system, according to a fifth embodiment.

Lens data of the imaging lens system according to the fifth embodiment, as shown in FIG. 9, is as below.

f=3.398 mm Fno=2.45 ω=33.5°

TABLE 9

| Surface | Radius of curvature | Thickness or air gap | Refractive index | Abbe number |
|---|---|---|---|---|
| OBJ | ∞ | ∞ | | |
| *1 | 1.3170 | 0.6339 | 1.531 | 56 |
| *2 | −6.0634 | 0.0000 | | |
| ST | ∞ | 0.0400 | | |
| *4 | 6.6704 | 0.3000 | 1.634 | 23.9 |
| *5 | 1.6144 | 0.2320 | | |
| *6 | 9.3977 | 0.3550 | 1.531 | 56 |
| 7 | ∞ | 0.3262 | | |
| *8 | −3.3775 | 0.4787 | 1.634 | 23.9 |
| *9 | −5.0958 | 0.0550 | | |
| *10 | 1.4755 | 0.5261 | 1.531 | 56 |
| *11 | 1.1182 | 0.1657 | | |
| 12 | ∞ | 0.3000 | 1.62 | 64 |
| 13 | ∞ | 0.4400 | | |

TABLE 10

| Surface | R | K | A | B | C | D | E | F |
|---|---|---|---|---|---|---|---|---|
| 1 | 1.3170E+00 | −1.6083E−01 | −2.6704E−02 | 2.9338E−02 | −2.0099E−01 | 2.4800E−01 | −2.0019E−01 | 0.0000E+00 |
| 2 | −6.0634E+00 | −4.5383E+01 | 1.1913E−02 | −1.3865E−02 | −5.5818E−02 | −2.7630E−01 | 4.6606E−01 | 0.0000E+00 |
| 4 | 6.6704E+00 | 4.3205E+01 | −3.2452E−02 | 2.7084E−01 | −6.0181E−01 | 7.0880E−01 | −1.7580E−01 | 0.0000E+00 |
| 5 | 1.6144E+00 | −7.6099E+00 | 1.5519E−01 | 1.7790E−01 | −4.4645E−01 | 6.4755E−01 | 5.7602E−03 | 0.0000E+00 |
| 6 | 9.3977E+00 | −7.6538E+02 | 2.0095E−02 | −7.6563E−02 | 3.7286E−02 | 1.5787E−01 | −4.5503E−01 | 0.0000E+00 |
| 8 | −3.3775E+00 | −1.6763E+02 | −5.8395E−02 | 1.6349E−02 | −2.7390E−01 | 2.6753E−01 | −1.0632E−01 | −7.0132E−02 |
| 9 | −5.0958E+00 | 1.2243E+01 | 2.7568E−02 | −6.5948E−02 | 3.0434E−02 | −5.2851E−03 | −5.8282E−01 | 2.6442E−03 |
| 10 | 1.4755E+00 | −1.6820E+01 | −2.4472E−01 | 7.3622E−02 | 1.2465E−02 | −7.3749E−03 | 3.9514E−04 | 9.9209E−05 |
| 11 | 1.1182E+00 | −7.4201E+00 | −1.4069E−01 | 5.2461E−02 | −1.8909E−02 | 3.5234E−03 | −3.1095E−04 | 2.5800E−05 |

Figure 10:
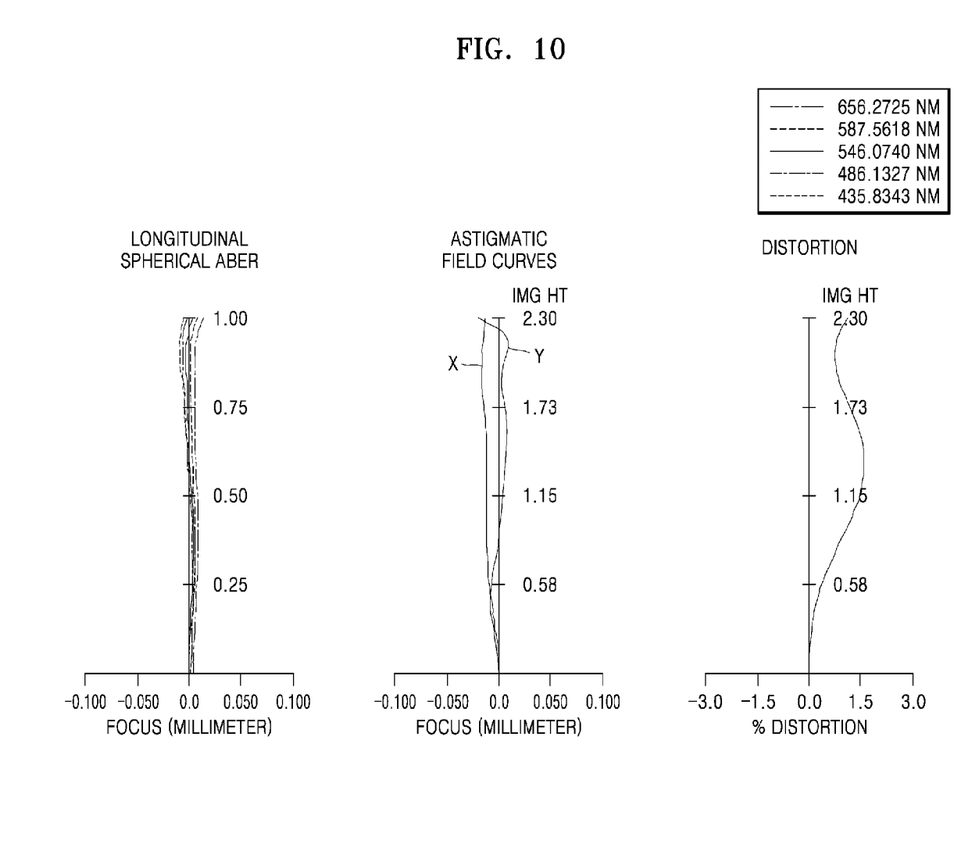
FIG. 10 illustrates diagrams of longitudinal spherical aberration, astigmatic field curves, and distortion of the imaging lens system according to the fifth embodiment.

FIG. 10 illustrates diagrams of longitudinal spherical aberration, astigmatic field curves, and distortion of the imaging lens system according to the fifth embodiment.

Table 11 shows that the first to fifth embodiments satisfy Conditions (1) to (4).

TABLE 11

| | First embodiment | Second embodiment | Third embodiment | Fourth embodiment | Fifth embodiment |
|---|---|---|---|---|---|
| f34 | −24.839 | −34.759 | −60.045 | −337.826 | −1778.611 |
| f | 3.392 | 3.387 | 3.385 | 3.391 | 3.398 |
| f34/f | −7.323 | −10.262 | −17.739 | −99.624 | −523.429 |
| f5 | −45.753 | −43.634 | −31.728 | −21.033 | −17.752 |
| f5/f | −13.489 | −12.883 | −9.373 | −6.203 | −5.224 |
| f1 | 1.96 | 1.974 | 1.983 | 2.018 | 2.091 |
| f2 | −3.09 | −3.043 | −3.041 | −3.121 | −3.401 |
| f2/f1 | −1.577 | −1.542 | −1.534 | −1.547 | −1.626 |
| V1 − V2 | 33 | 33 | 33 | 33 | 32.1 |

According to the imaging lens systems described above, with a proper curvature of each of the lenses and proper arrangement between the lenses forming each imaging lens system, various kinds of aberration may be reduced, and a high-resolution image may be obtained.

The imaging lens systems described above have a thin structure and achieves the optical performance that is applicable to image pickup devices having high pixel density.

In addition, the imaging lens systems described above use a plastic material and realize a lens shape having low assembly sensitivity, thereby resulting in low manufacturing costs and easy mass production.

The imaging lens systems according to the first to fifth embodiments may be employed in various types of electronic apparatuses, e.g., imaging apparatuses, optical devices, and mobile devices, together with an image pickup device for converting an optical image formed through such an imaging lens system to an electrical signal.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

While the imaging lens systems have been described with reference to the accompanying drawings to help the understanding thereof, they are only illustrative, and it will be understood by one of ordinary skill in the art that various changes in form and details may be made therein without departing from the spirit and scope of the invention as defined by the following claims.

What is claimed is:

1. An imaging lens system comprising:
a first lens having a positive refractive power and an object side lens surface that is convex toward an object side;
a second lens having a negative refractive power and a meniscus shape that is concave toward an image side;
a third lens having a positive refractive power;
a fourth lens having a negative refractive power and a meniscus shape that is concave toward the object side; and
a fifth lens having a negative refractive power and a meniscus shape that is concave toward the image side near an optical axis,
wherein the first to fifth lenses are sequentially disposed from the object side to an image side, and
the imaging lens system satisfies the conditions below:

$-524 < f34/f < -5$ $-14 < f5/f < -4$, and $-1.8 < f2/f1 < -1.3$ where f denotes a focal length of the imaging lens system, f34 denotes an effective focal length of the third lens and the fourth lens, and f5 denotes a focal length of the fifth lens f1 denotes a focal length of the first lens, and f2 denotes a focal length of the second lens.

2. The imaging lens system of claim 1, wherein an image side lens surface of the third lens is flat.

3. The imaging lens system of claim 1, wherein an aperture stop is disposed between the first lens and the second lens.

4. The imaging lens system of claim 1, wherein the first to fifth lenses are made of a plastic material.

5. The imaging lens system of claim 1, wherein each of the first to fifth lenses is an aspheric lens including at least one aspheric surface.

6. An electronic apparatus comprising:
the image lens system of claim 1; and
an image pickup device that converts an optical image formed by the image lens system into an electrical signal.

7. An imaging lens system comprising:
a first lens having a positive refractive power and an object side lens surface that is convex toward an object side;
a second lens having a negative refractive power and a meniscus shape that is concave toward an image side;
a third lens having a positive refractive power;
a fourth lens having a negative refractive power and a meniscus shape that is concave toward the object side; and
a fifth lens having a negative refractive power and a meniscus shape that is concave toward the image side near an optical axis,
wherein the first to fifth lenses are sequentially disposed from the object side to the image side, and
the imaging lens system satisfies the conditions below:

$-524 < f34/f < -5$ and $-1.8 < f2/f1 < -1.3$, where f denotes a focal length of the imaging lens system, f34 denotes an effective focal length of the third lens and the fourth lens, f1 denotes a focal length of the first lens, and f2 denotes a focal length of the second lens.

8. The imaging lens system of claim 7, wherein the surface of the third lens towards the image plane is flat.

9. The imaging lens system of claim 7, wherein an aperture stop is disposed between the first lens and the second lens.

10. The imaging lens system of claim 7, wherein the first to fifth lenses are made of a plastic material.

11. The imaging lens system of claim 7, wherein each of the first to fifth lenses is an aspheric lens including at least one aspheric surface.

* * * * *